United States Patent
Fanteux et al.

[11] Patent Number: 5,965,297
[45] Date of Patent: Oct. 12, 1999

[54] ELECTRODE MATERIALS HAVING CARBON PARTICLES WITH NANO-SIZED INCLUSIONS THEREWITHIN AND AN ASSOCIATED ELECTROCHEMICAL AND FABRICATION PROCESS

[75] Inventors: Denis G. Fanteux; Jie Shi, both of Acton; Wlodek Krawiec, Woburn, all of Mass.

[73] Assignee: Mitsubhish Chemical Corporation, Tokyo, Japan

[21] Appl. No.: 08/954,144

[22] Filed: Oct. 20, 1997

[51] Int. Cl.$^6$ ........................................... H01M 4/02
[52] U.S. Cl. .................. 429/231.8; 429/219; 429/220; 429/229; 429/233; 423/445 R
[58] Field of Search ..................... 429/219, 220, 429/229, 231.8, 233; 423/445 R

[56] References Cited

U.S. PATENT DOCUMENTS

| | | | |
|---|---|---|---|
| 4,945,014 | 7/1990 | Miyabayashi et al. | 429/218 |
| 5,432,029 | 7/1995 | Mitate | 429/194 |
| 5,478,364 | 12/1995 | Mitate | 29/623.5 |
| 5,482,797 | 1/1996 | Yamada | 429/218 |
| 5,587,256 | 12/1996 | Wilson | 429/218 |
| 5,591,547 | 1/1997 | Yoneda | 429/218 |

FOREIGN PATENT DOCUMENTS

| | | | |
|---|---|---|---|
| 0 729 194 A2 | 1/1996 | European Pat. Off. | |
| 0729194A2 | 8/1996 | European Pat. Off. | H01M 4/58 |
| 5-286763 | 4/1992 | Japan . | |
| 6-279112 | 3/1993 | Japan . | |
| 5-286763 | 11/1993 | Japan | H01M 4/02 |
| 8-231273 | 2/1995 | Japan . | |
| 10-3920 | 6/1996 | Japan . | |

OTHER PUBLICATIONS

U.S. Translation of Heisei 5–286763.
U.S. Translation of Heisei 8–231273.
U.S. Translation of Heisei 6–279112.
U.S. Translation of Heisei 10–3920.
Will Advanced Li–Alloy Anodes Have a Change in Lithium–Ion Batteries, by O.J. Besenhard et al., Institute of Chemical Technology of Organic Materials, Technical University in Austria, pp. 69–72.

*Primary Examiner*—Maria Nuzzolillo
*Assistant Examiner*—Angela J. Martin
*Attorney, Agent, or Firm*—Factor and Shaftal

[57] ABSTRACT

An electrode for use in an electrolytic cell and an associated process, wherein the electrode includes a current collecting substrate, an electrode active material having at least one component including inclusions no greater than one micron within a carbon particle. The electrode includes degradation preclusion mean which comprise the inclusions having a volumetric variation which is less than the maximum elasticity of the associated carbon particle.

17 Claims, 3 Drawing Sheets

ELECTRODE MATERIALS HAVING CARBON PARTICLES WITH NANO-SIZED INCLUSIONS THEREWITHIN AND AN ASSOCIATED ELECTROCHEMICAL AND FABRICATION PROCESS

BACKGROUND OF THE INVENTION

1. Field of the invention

The present invention relates in general to electrode materials, and more particularly, to electrode materials having components comprising metal inclusions no larger than one micron within carbon particles. The invention is also directed to an electrolytic process and a process for fabricating an electrode with an active material having such components.

2. Background Art

As the demand for high output rechargeable batteries continues to grow, scientists are constantly attempting to increase the energy density and cycling life of batteries. In an effort to enhance these two highly desired qualities, researchers have been striving to maximize the benefits of active material in electrode pastes, increase the gravimetric and volumetric capacity of the active material, and optimize the interfacial characteristics of the electrode pastes. Unfortunately, the electrode materials developed up to date have only exhibited some of these desired properties.

In particular, the first generation "modern" rechargeable batteries utilized lithium metal as its primary anode component. While, metallic lithium provides very high capacity values, its instability and poor interfacial characteristics remained problematic. Second generation rechargeable batteries used lithium alloy anodes. While lithium alloy anodes provided some improvement in cycling efficiency and interfacial characteristics, capacity values remain significantly less than that of pure lithium anodes. Moreover, the improvement of electrochemical properties was not sufficient to allow commercialization of the product. Batteries have also been made with carbonaceous insertion materials (e.g. graphite). Such batteries exhibited good cycle life, but relatively low capacity in comparison to lithium and/or lithium alloy materials. Furthermore, experimentation has been done with the use of metal/metal alloy particles within a carbonaceous matrix. Although such carbon metal compounds exhibited acceptable interfacial properties, as well as promising cycling efficiency, their inability to obtain and maintain a desired high volumetric capacity limited their use in electrochemical cells.

SUMMARY OF THE INVENTION

The present invention is directed to an electrode for use in an, electrochemical cell (hereinafter sometimes referred to as "electrolytic cell"), comprising a current collecting substrate and an electrode active material having at least one component including inclusions no greater than one micron within a carbon particle. Means are associated with the component for precluding mechanical degradation of the component and, in turn, loss of electrical contact with adjacent components.

In a preferred embodiment, the degradation preclusion means includes the inclusions having a diameter ranging up to $1.0 \times 10^{-6}$ meters.

In a preferred embodiment, the diameter of the carbon particle is greater than the diameter of each of the inclusions within it.

In another preferred embodiment, the inclusions are selected from the group of tin, copper, antimony, zinc, silver, gold, and mixtures and alloys thereof.

The present invention is also directed to a process for manufacturing an electrolytic cell comprising the steps of: a) synthesizing a first electrode active material comprised of components having inclusions no greater than one micron within a carbon particle; b) applying the synthesized first electrode active material to a current collecting substrate; c) associating an electrolyte with the synthesized first electrode active material; and d) associating a second electrode adjacent the electrolyte.

In a preferred embodiment, the step of synthesizing a first electrode active material is selected from the group of pyrolysis of organometallic compounds, plasma treatment of organic/organometallic compounds, chemical vapor deposition of organic/organometallic compounds, and sol-gel of organic/organometallic compounds, or any combination thereof.

The present invention is also directed to an electrolytic process associated with an electrolytic cell comprising the steps of: a) applying an electrical charge to an electrolytic cell having an anode, a cathode and an electrolyte, wherein the anode includes an active material having at least one component which includes at least one inclusion no greater than one micron within a carbon particle; each of the inclusions having at least a portion in contact with the associated carbon particle, and, each of the at least one carbon particles being conductively associated with each other; b) intercalating metal ions into the inclusions within the associated carbon particles; c) maintaining continuity between the carbon particles during and after the step of intercalating; and d) maintaining continuity between the inclusions and the associated carbon particles during and after the step of intercalating.

The process further includes the steps of: e) deintercalating the previously intercalated ions out of the inclusions; f) maintaining continuity between the carbon particles during and after the step of intercalating; and g) maintaining continuity between the inclusions and the associated carbon particles during and after the step of intercalating.

DETAILED DESCRIPTION OF THE DRAWINGS

While this invention is susceptible of embodiment in many different forms, there is shown in the drawings and will herein be described in detail one specific embodiment with the understanding that the present disclosure is to be considered as an exemplification of the principles of the invention and is not intended to limit the invention to the embodiment illustrated.

Figure 1:
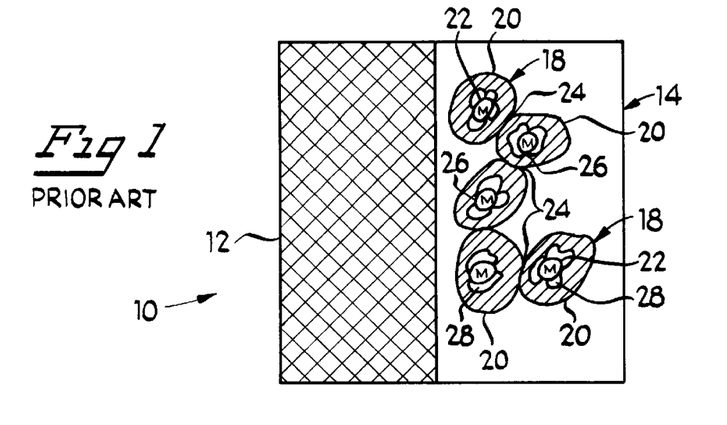
FIG. 1 of the drawings is a schematic representation of a prior art electrode before an initial charge.

Prior art electrode 10 is shown in FIG. 1, prior to an initial charge, as including current collector 12 and paste layer, or electrode paste layer (hereinafter "electrode layer") 14. Electrode layer 14 comprises a plurality of components 18. Each component includes a carbon particle 20 having greater than one micron sized inclusion 22. As can be seen, each of the carbon particles 20 are in contact with each other at various contact points 24, and, each inclusion has points of contact 26 with the associated carbon particles, as well as voids 28. The voids are intended to enable expansion of the inclusions upon intercalation of various ions, such as lithium ions, so as to result in lithium metal inclusions 30 (FIG. 2).

Figure 2:
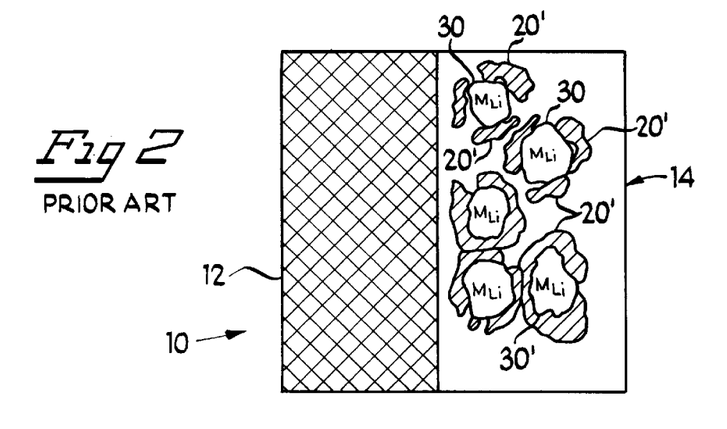
FIG. 2 of the drawings is a schematic representation of a prior art electrode after an initial charge.
Figure 3:
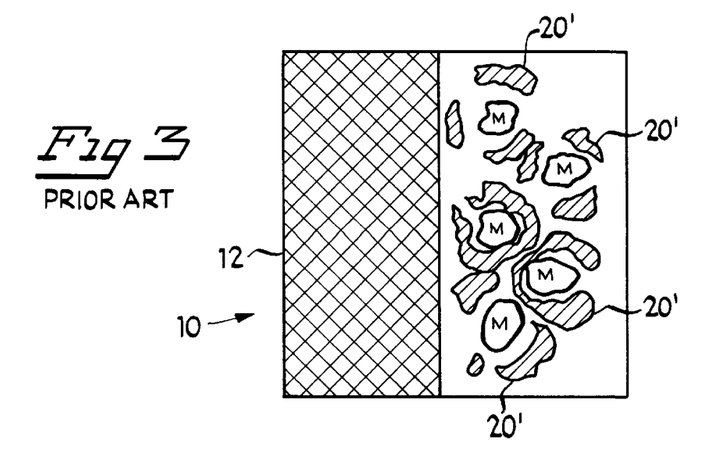
FIG. 3 of the drawings is a schematic representation of a prior art electrode after an initial discharge.

Prior art electrode 10 is shown in FIG. 2, after an initial charge cycle, as including current collector 12 and electrode layer 14. Electrode layer 14 now includes expanded lithium metal inclusions 30 surrounded, in part, by carbon particles 20'. Unfortunately, during cycling of the electrolytic cell (which utilizes such a prior art electrode), the volume changes of inclusion 30, after intercalation, actually expand greater than the elasticity of the associated carbon particles. As a result, such expansion actually causes the associated carbon particles to crack, whereby such cracking not only results in a loss of electrical continuity between the particles, but it also results in electrolyte migration and decomposition on the metal/metal alloy inclusions. Furthermore, upon deintercalation of the ions (lithium) from the inclusions, the volume size of the inclusion may actually decrease (as shown in FIG. 3). Accordingly, not only is their a loss of continuity between at least various ones of the carbon particles, but in many cases, there is a complete loss of continuity between the inclusion particle and the previously associated carbon particle.

Figure 4:
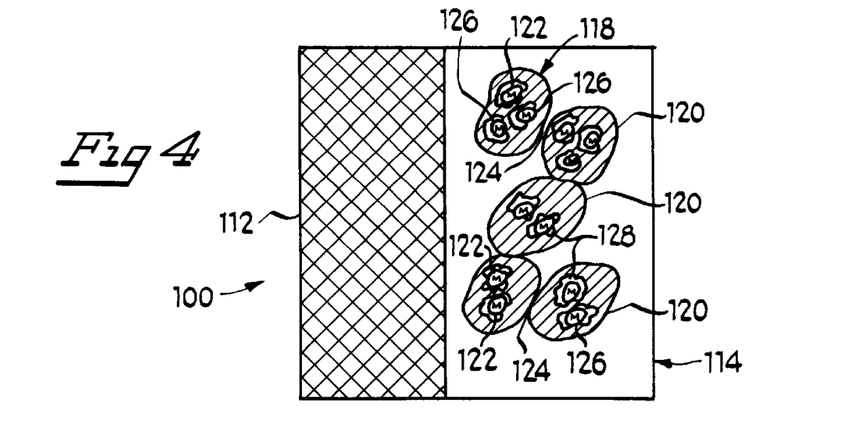
FIG. 4 of the drawings is a schematic representation of the present invention electrode before an initial charge.

Electrode 100 of the present invention, is shown in FIG. 4 prior to an initial charge, as including current collector 112 and electrode layer 114. As will be understood to those having ordinary skill in the art, the electrode will comprise an anode, and current collector 112 may comprise any of a number of conventional materials. Electrode layer 114 comprises a plurality of components 118. Each component includes a carbon particle 120 having at least one inclusion 122 no greater than one micron in size. As can be seen, each of the carbon particles 120 are in contact with each other at various contact points 124, and, each inclusion has points of contact 126 with the associated carbon particles, as well as voids 128. The voids are intended to enable expansion of the inclusion upon intercalation of particle ions, such as lithium ions. However, even though such expansion is available, as will be explained, very little expansion, if any, is necessary. Furthermore, the particular inclusions may eventually comprise one micron-sized, or less, such as nano-sized clusters/inclusions 130 (FIG. 5) of tin, copper, antimony, zinc, silver, gold, and many other alkali, alkaline earth, and transitional metals—so long as the particular metal exhibits favorable electrochemical characteristics and, provided the clusters remain no greater in diameter than one micron. Metal/metal alloy inclusions 130 may also comprise alloys and mixtures of the aforementioned metals.

Carbon particles 120, for illustrative purposes, comprise an amorphorous carbon however other carbonaceous materials known to those having ordinary skill in the art, which facilitate proper interfacial characteristics are likewise contemplated for use.

Figure 5:
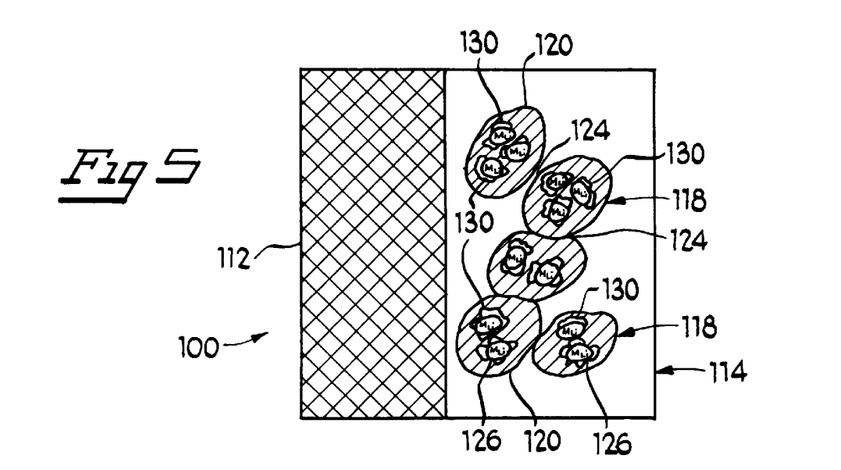
FIG. 5 of the drawings is a schematic representation of the present invention electrode after an initial charge.

Electrode 100 is shown in FIG. 5, after an initial charge cycle, as including current collector 112 and electrode layer 114. Electrode layer 114 still comprises a plurality of carbon particles 120 now having metal/metal alloy inclusions 130 (one micron or less) as a result of intercalation of lithium ions therein. However, unlike the prior art, the carbon particles have not cracked. Indeed, such a phenomenon has occurred because the inclusions expand within the carbon matrix only to a volume amount which is less than the maximum amount of what the associated carbon particles can be expanded to without mechanical fatigue. Accordingly, not only is cracking avoided, but, the carbon particles remain in contact with each other, as do the inclusions within the carbon particles.

Figure 6:
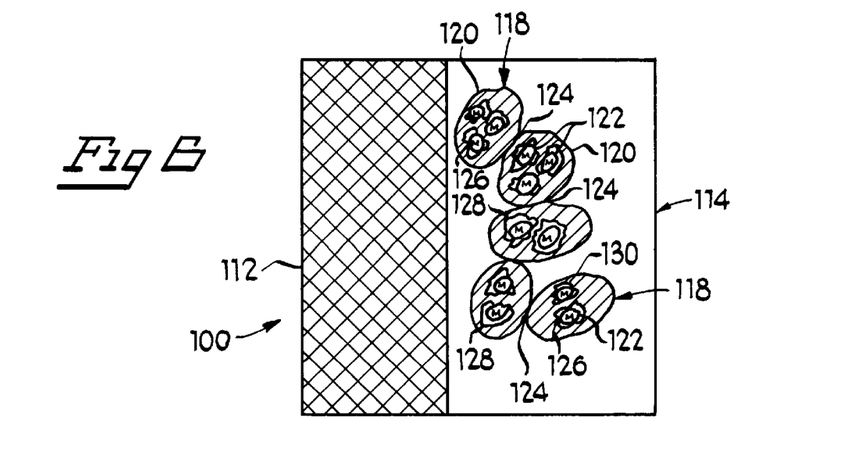
FIG. 6 of the drawings is a schematic representation of the present invention electrode after an initial discharge.

Electrode 100 is shown in FIG. 6 after discharge, and, in turn, after deintercalation of the lithium ions. As can be seen, even after such deintercalation, the volume decrease of inclusion particles 122 (from inclusion 130) are nominal. Accordingly, such inclusions do not pull out of contact with the associated carbon particles. As a result, electrical conductivity between the carbon particles, as well as between the carbon particles and associated inclusions are maintained during cell cycling. Furthermore, not only is cell cycling increased over the prior art, but, such inclusions within carbon particles which do not crack as a result of volumetric changes in the inclusions, enables the associated electrode 100 to reach a density of at least 3 g/cc and a volumetric capacity of at least 1000 mAh/cc.

In support of the present invention, several experiments were conducted wherein electrode materials having components with carbon particles having metal/metal alloy inclusions no greater than one micron were synthesized and electrochemically characterized. In particular, a solution phase/pyrolysis synthetic route was used to prepare the carbon with metal inclusions for use in an electrode material. However, as will be discussed below, several other conventional synthetic routes known to those having ordinary skill in the art are likewise contemplated for use (e.g. sol-gel synthesis)—so long as each synthetic route yields carbon with metal/metal alloy inclusions which are characterized by appropriate physical and electrochemical attributes as contemplated herein.

Specifically, six experiments were conducted wherein the following common experimental procedure was used:

First, distilled water was charged into a reaction vessel—although other commercially available solvents are likewise suitable for use as long as the particular solvent readily dissolves ionic salts.

Second, a metal ionic salt was charged into the reaction vessel. For illustrative purposes only, the ionic salt comprised tin sulfate—although, as will be evident from the tabulated data below, several other ionic salts, including, copper nitrate, tin nitrate, zinc nitrate, silver nitrate, copper sulfate, zinc sulfate, and silver sulfate are likewise contemplated for use.

Third, carbon powder was charged into the reaction vessel and agitation was initiated. Examples of commercially available carbonaceous materials include LONZA KS-6 graphite, ASHBURY MILLS U-440 graphite, and CABOT XC72R black carbon.

Fourth, a heat source was applied to the reaction vessel to initiate solvent evaporation. After the solvent evaporated, a solid mixture of carbon and metal salt remained.

Fifth, the carbon/metal salt mixture was introduced into a control atmosphere oven having a temperature set point range from 400–600 degrees centigrade. After exposure to the oven in step five, the anion component of the metal salt was converted from its original species to oxide.

Sixth, the metal salt/carbon mixture was exposed to a greater temperature set point approaching 600 degrees centigrade. After exposure to the oven in step six, the metal oxide was finally reduced to a metallic state.

Seventh, (for the components coated with phenolic resin) acetone was charged into a second reaction vessel, and phenol-formaldehyde resin was readily dissolved therein via agitation. While phenol-formaldehyde resin is used for illustrative purposes, numerous other polymeric carbon precursor compounds which would be obvious to one having ordinary skill in the art, are likewise contemplated for use.

Eighth, the metal/carbon material from the sixth step of the synthesis was transferred into the second reaction vessel containing the dissolved phenolic resin and the mixture was homogenized via agitation.

Ninth, the metal/carbon material coated with phenolic resin was isolated from the solvent (acetone) via reduced pressure distillation. While reduced pressure distillation was used to isolate the product, numerous other separation methods, including precipitation and spray drying, where the acetone is evaporated, are likewise contemplated for use.

Tenth, the precipitated carbon/metal material coated with phenolic resin was introduced into a control atmosphere oven having a temperature set point of approximately 170 degrees centigrade. At step ten in the synthesis, the product was partially cured to remove moisture before the product was exposed to a final high temperature oven.

Eleventh, the product was introduced into a control atmosphere oven having a temperature set point of approximately 600 degrees centigrade. After step eleven, the carbon-metal nanocomposite material was completely synthesized and ready for characterization.

Alternatively, experimentation has verified that sol-gel synthetic routes are likewise suitable for manufacturing carbon particles with inclusion materials no greater than one micron. In particular, the following seven step sol-gel synthesis was used to produce comparable components to those of experiments 2–7.

First, 22.0 grams of ALDRICH resorcinol and 500 mls of water were charged into a reaction vessel.

Second, 24.3 grams (37% wt) of ALDRICH formaldehyde in water was charged into the reaction vessel.

Third, 180 mls (15% wt) of an ALFA-CAESAR colloidal nanosuspension of $SnO_2$ in water was charged into the reaction vessel and agitation was initiated and maintained at 15,000 revolutions per minute. The average diameter of the tin oxide particles in the colloidal suspension were approximately 15 nanometers, and the pH of the suspension was alkaline in the range of 9-10. The concentration of the available counter ion ($NH_4^+$) was 0.12 moles per 1 mole of tin oxide.

Fourth, the water was partially evaporated via a rotary evaporator until essentially only residue remained.

Fifth, the residue was dried in an inert atmosphere oven at approximately 100 degrees centigrade.

Sixth, the remaining resin powder was "cured" for two hours at 160 degrees centigrade.

Seventh, the cured resin was placed into a quartz boat and subsequently inserted into a control atmosphere tube furnace for pyrolysis treatment. The temperature set point of the furnace was 700 degrees centigrade, and the resin underwent pyrolysis for two hours. The time required to heat the sample from ambient temperature to 700 degrees centigrade was approximately three hours.

The resulting pyrolized sample exhibited ultra fine powder, and contained approximately (65% wt) tin nanoparticles and (35% wt) carbon obtained by pyrolysis of phenolic resin.

While the aforementioned solution phase/pyrolysis and sol-gel/pyrolysis synthetic routes have been described for illustrative purposes only, several other synthetic routes known to those having ordinary skill in the art, are likewise contemplated for use—including, pyrolysis of organometallic compounds such as metal salts of porphines and phthalocyanines, plasma treatment of organic/ organometallic compounds, and chemical vapor deposition of organic/organometallic compounds.

After synthesis, each resulting carbon with the inclusion material was pressed onto a nickel felt electrode at a pressure of approximately one ton per square centimeter.

A three electrode cell (a new cell was constructed for each of the inclusion samples) was then constructed wherein the electrode with the pressed carbon with the inclusion materials served as the working electrode, and the counter electrode and reference electrode were both constructed from lithium. The electrolyte used in each of the cells, and, in turn, in each of the experiments comprised a one molar solution of $LiAsF_6$ dissolved in propylene carbonate diluted 5% with 1,6-dioaspiro[4.4]noname-2-7 dione (an additive). The fully constructed cells were then characterized using a Maccor cycler.

Experiment No. 1

In this experiment the following experimental parameters were used for synthesis of a prior art carbon-metal material. Note that for this experiment the carbon with the inclusion material was not coated with phenolic resin, rather the material comprised only tin and graphite.

| Metal Ratio (mol %) | Metal Content (wt %) | Graphite Content (wt %) | Density (g/cc) |
|---|---|---|---|
| 100 (Sn) | 60 | 40 | 4.127 |

The characterization results verify that, indeed, prior art carbon-metal materials, having an inclusion particle size distribution of approximately greater than 1–3 microns, exhibited relatively poor electrochemical qualities after continued cycling, as compared to the cycle efficiency of the present invention.

| Initial Measured Volumetric Capacity (mAh/cc) | First Cycle Efficiency (%) | Third Cycle Efficiency (%) | Fifth Cycle Efficiency (%) | Tenth Cycle Efficiency (%) |
|---|---|---|---|---|
| 2348 | 76.5 | 81.5 | 81.1 | N/A |

Experiment No. 2

In this experiment the following experimental parameters were used for synthesis of the carbon particles with metal nano-sized inclusion material. Note that for this experiment the material was not coated with phenolic resin, rather the material comprised only tin, copper and graphite.

| Metal Ratio (mol %) | Metal Content (wt %) | Graphite Content (wt %) | Density (g/cc) |
|---|---|---|---|
| 91 (Sn)/9 (Cu) | 60 | 40 | 4.127 |

Figure 7:
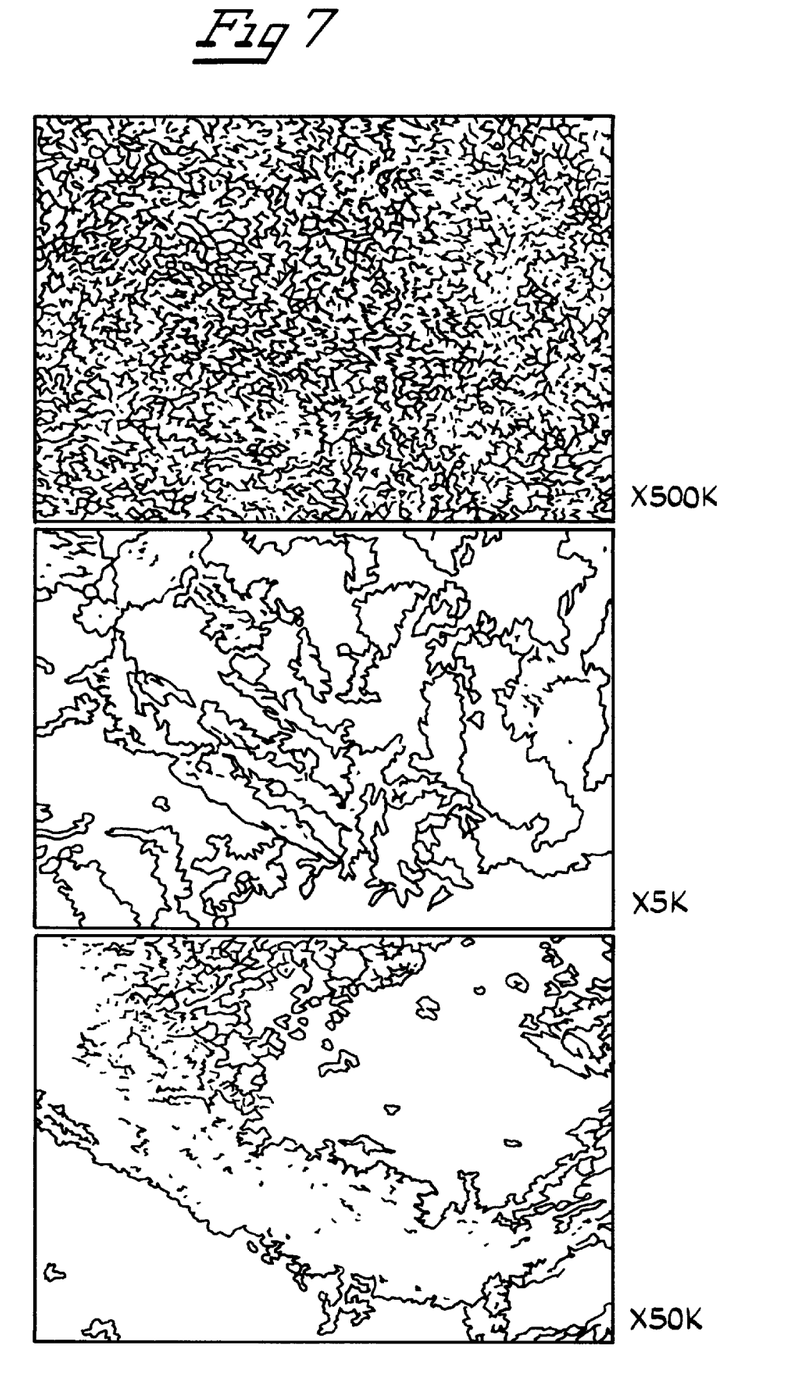
FIG. 7 of the drawings is a microphotograph of the present invention component material of experiment No. 2.

The characterization results verify that, indeed, carbon with tin copper alloy inclusions, having an inclusion particle size distribution of approximately 30–50 nanometers, as shown in FIG. 7, exhibited favorable electrochemical qualities for use in secondary electrolytic cells.

| Initial Measured Volumetric Capacity (mAh/cc) | First Cycle Efficiency (%) | Third Cycle Efficiency (%) | Fifth Cycle Efficiency (%) | Tenth Cycle Efficiency (%) |
|---|---|---|---|---|
| 2009 | 67.9 | 89.1 | 87.0 | N/A |

Experiment No. 3

In this experiment the following experimental parameters were used for synthesis of the carbon particles with metal nano-sized inclusion material. Note that the material composition comprised approximately 16 percent by weight of the carbon obtained by pyrolysis of phenolic resin.

| Metal Ratio (mol %) | Metal Content (wt %) | Graphite Content (wt %) | Density (g/cc) |
|---|---|---|---|
| 91 (Sn)/9 (Cu) | ~50 | ~34 | 3.432 |

The characterization results verify that, indeed, carbon particles with tin-copper alloy nano-sized inclusions coated with phenolic resin having an inclusion particle size distribution of approximately 30–50 nanometers, exhibited favorable electrochemical qualities for use in secondary electrolytic cells. Note that this material is merely the product of Experiment No. 2 coated with carbon obtained by pyrolysis of phenolic resin.

| Initial Measured Volumetric Capacity (mAh/cc) | First Cycle Efficiency (%) | Third Cycle Efficiency (%) | Fifth Cycle Efficiency (%) | Tenth Cycle Efficiency (%) |
|---|---|---|---|---|
| 1571 | 73.1 | 92.8 | 91.9 | 91.5 |

Experiment No. 4

In this experiment the following experimental parameters were used for synthesis of the carbon particles with metal nano-sized inclusion material. Note that the composition comprised approximately 32 percent by weight of the carbon obtained by pyrolysis of phenolic resin.

| Metal Ratio (mol %) | Metal Content (wt %) | Graphite Content (wt %) | Density (g/cc) |
|---|---|---|---|
| 91 (Sn)/9 (Zn) | ~40 | ~28 | 2.971 |

The characterization results verify that, indeed, carbon particles with tin-zinc alloy nano-sized inclusions coated with phenolic resin having inclusion particle sizes less than 100 nanometers, exhibited favorable electrochemical qualities for use in secondary electrolytic cells.

| Initial Measured Volumetric Capacity (mAh/cc) | First Cycle Efficiency (%) | Third Cycle Efficiency (%) | Fifth Cycle Efficiency (%) | Tenth Cycle Efficiency (%) |
|---|---|---|---|---|
| 1084 | 70.7 | 92.8 | 89.3 | 92.3 |

Experiment No. 5

In this experiment the following experimental parameters were used for synthesis of the carbon particles with metal nano-sized inclusion material. Note that for this experiment the material was not coated with phenolic resin, rather the material comprised only tin, silver and graphite.

| Metal Ratio (mol %) | Metal Content (wt %) | Graphite Content (wt %) | Density (g/cc) |
|---|---|---|---|
| 91 (Sn)/9 (Ag) | ~60 | ~40 | 4.189 |

The characterization results verify that, indeed, carbon particles with tin-silver alloy nano-sized inclusions uncoated with phenolic resin having particle sizes less than 100 nanometers, exhibited favorable electrochemical qualities for use in secondary electrolytic cells.

| Initial Measured Volumetric Capacity (mAh/cc) | First Cycle Efficiency (%) | Third Cycle Efficiency (%) | Fifth Cycle Efficiency (%) | Tenth Cycle Efficiency (%) |
| --- | --- | --- | --- | --- |
| 2010 | 69.0 | 87.2 | 86.0 | N/A |

Experiment No. 6

In this experiment the following experimental parameters were used for synthesis of the carbon particles with metal nano-sized inclusion material. Note that the composition comprised approximately 16 percent by weight of the carbon obtained by pyrolysis of phenolic resin.

| Metal Ratio (mol %) | Metal Content (wt %) | Graphite Content (wt %) | Density (g/cc) |
| --- | --- | --- | --- |
| 91 (Sn)/9 (Ag) | ~50 | ~34 | 3.526 |

The characterization results verify that, indeed, carbon particles with tin-silver alloy nano-sized inclusions coated with phenolic resin having particle sizes less than 100 nanometers, exhibited favorable electrochemical qualities for use in secondary electrolytic cells.

| Initial Measured Volumetric Capacity (mAh/cc) | First Cycle Efficiency (%) | Third Cycle Efficiency (%) | Fifth Cycle Efficiency (%) | Tenth Cycle Efficiency (%) |
| --- | --- | --- | --- | --- |
| 1544 | 74.3 | 90.0 | 90.5 | N/A |

As can be seen from each of the above experiments, the utilization of carbon particles with metal/metal alloy nano-sized inclusions for use in the electrode active material resulted in an anode having excellent energy density and volumetric capacity.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

What is claimed is:

1. An electrode for use in an electrochemical cell comprising:
    a current collecting substrate;
    an electrode active material having at least one component including at least one inclusion no greater than one micron in size, within a carbon particle;
    means associated with the at least one component for precluding mechanical degradation of the component and, in turn, loss of electrical contact therebetween, wherein the degradation preclusion means comprises the at least one inclusion having a volumetric variation which is less than the maximum elasticity of the associated carbon particle.

2. The electrode according to claim 1, wherein each of the inclusions have a diameter ranging from $1.0 \times 10^{-9}$ meters to $1.0 \times 10^{-6}$ meters.

3. The electrode according to claim 1 having a density of at least 3g/cc and a volumetric capacity of at least 1000 mAh/cc.

4. The electrode according to claim 1, wherein the carbon particle is pyrolized phenol-formaldehyde resin.

5. The electrode according to claim 1, wherein the at least one inclusion is selected from the group of tin, copper, antimony, zinc, silver, gold, and mixtures and alloys thereof.

6. An electrochemical cell comprising:
    an electrolyte;
    a first electrode and a second electrode, wherein at least one of the first and second electrodes comprises:
        a current collecting substrate;
        an electrode active material having at least one component including at least one inclusion no greater than one micron within a carbon particle; and
        means associated with the at least one component for precluding mechanical degradation of the component and, in turn, loss of electrical contact therebetween, wherein the degradation preclusion means the at least one inclusion having a volumetic variaton which is less than the maximum elasticity of the associated carbon particle.

7. The electrode according to claim 6 wherein each of the inclusions have a diameter ranging from $1.0 \times 10^{-9}$ meters to $1.0 \times 10^{-6}$ meters.

8. The electrochemical cell according to claim 6, wherein the carbon particle is pyrolized phenol-formaldehyde resin.

9. The electrochemical cell according to claim 6, wherein the at least one inclusion is selected from the group of tin, copper, antimony, zinc, silver, gold, and mixtures and alloys thereof.

10. A process for fabricating an electrochemical cell comprising the steps of:
    synthesizing at least one component for a first electrode active material, wherein the first component includes at least one inclusion no greater than one micron within a carbon particle and wherein the at least one inclusion has a volumetric variation which is less than the maximum elasticity of the associated carbon particle;
    applying the first electrode active material to a current collecting substrate;
    associating an electrolyte with the first electrode active material; and
    associating a second electrode adjacent the electrolyte.

11. The process according to claim 10, wherein the step of synthesizing the at least one component comprises the step of synthesizing each of the inclusions to have a diameter ranging from $1.0 \times 10^{-9}$ meters to $1.0 \times 10^{-6}$ meters.

12. The process according to claim 10, wherein the carbon particle is pyrolized phenol-formaldehyde resin.

13. The process according to claim 10, wherein the inclusions are selected from the group of tin, copper, antimony, zinc, silver, gold, and mixtures and alloys thereof.

14. The process according to claim 10, wherein the step of synthesizing a first component is selected from the group of pyrolysis of organic/organometallic compounds, plasma treatment of organic/organometallic compounds, chemical vapor deposition or organic/organometallic compounds, and sol-gel of organic/organometallic precursors or any combination thereof.

15. An electrochemical process associated with an electrolytic cell comprising the steps of:

applying an electrical charge to an electrochemical cell having an anode, a cathode and an electrolyte, wherein the anode includes an active material having at least one component which includes at least one inclusion no greater than one micron within a carbon particle and wherein the at least one inclusion has a volumetric variation which is less than the maximum elastiity of the associated carbon particle;

each of the inclusions having at least a portion in contact with the associated carbon particle, and, each of the at least one carbon particles being conductively associated with each other;

intercalating metal ions into the inclusions within the associated carbon particles;

maintaining continuity between the carbon particles during and after the step of intercalating; and     maintaining continuity between the inclusions and the associated carbon particles during and after the step of intercalating.

16. The electrochemical process according to claim 13 further including the steps of:

deintercalating the previously intercalated ions out of the inclusions;

maintaining continuity between the carbon particles during and after the step of deintercalating; and     maintaining continuity between the inclusions and the associated carbon particles during and after the step of deintercalating.

17. The electrochemical process according to claim 16, further including the step of enabling the anode to have a density of at least 3 g/cc and a volumetric capacity of at least 1000 mAh/cc.

* * * * *

UNITED STATES PATENT AND TRADEMARK OFFICE
CERTIFICATE OF CORRECTION

PATENT NO. : 5,965,297

DATED : October 12, 1999

INVENTOR(S) :
    Fauteux et al.

It is certified that error appears in the above-identified patent and that said Letters Patent is hereby corrected as shown below:

Col. 1, line 12                               Delete "electrolytic" and insert instead -- electrochemical --.

Signed and Sealed this

Ninth Day of May, 2000

Attest:

Q. TODD DICKINSON

Attesting Officer                *Director of Patents and Trademarks*